United States Patent [19]

Guenther

[11] 4,376,457
[45] Mar. 15, 1983

[54] EASY-ON TIRE CHAINS

[76] Inventor: Carl D. Guenther, 7900 Airlane Ave., Los Angeles, Calif. 90045

[21] Appl. No.: 357,906

[22] Filed: Mar. 15, 1982

Related U.S. Application Data

[63] Continuation-in-part of Ser. No. 150,458, May 16, 1980, Pat. No. 4,324,278.

[51] Int. Cl.³ .............................................. B60C 27/00
[52] U.S. Cl. ................................ 152/213 R; 152/218; 152/233; 152/241; 403/64; 403/169
[58] Field of Search ............... 152/233, 232, 231, 214, 152/216, 218, 213 A, 213 R, 223, 239, 240, 241, 211 N; 24/68 TT, 219, 69 TT, 220, 299, 370; 403/64, 169, 217; 411/435, 366, 363, 364, 513, 514, 515

[56] References Cited

U.S. PATENT DOCUMENTS

| | | | |
|---|---|---|---|
| 1,123,076 | 12/1914 | Bodenstein | 152/218 |
| 1,263,086 | 4/1918 | McLaughin | 411/366 |
| 1,320,916 | 11/1919 | Randolph | 152/218 |
| 1,339,963 | 5/1920 | Mahan | 152/241 |
| 1,455,409 | 5/1923 | Poli | 152/241 |
| 1,472,448 | 10/1923 | Weaver | 152/241 |
| 1,751,013 | 3/1930 | McMullen | 411/364 |
| 1,758,944 | 5/1930 | Grosch | 152/213 R |
| 2,086,512 | 7/1937 | Reyburn | 152/239 |
| 2,234,492 | 3/1941 | Henry | 152/242 |
| 2,252,778 | 8/1941 | Morss | 152/213 R |
| 2,310,807 | 2/1943 | Pool | 152/242 |
| 2,328,808 | 9/1943 | Holtz | 152/242 |
| 2,460,023 | 1/1949 | McGuiness | 152/241 |
| 3,085,462 | 4/1963 | Myers | 24/211 N X |
| 3,362,450 | 1/1968 | Brown | 152/233 |
| 3,513,897 | 5/1970 | Morris | 152/233 |
| 3,945,162 | 3/1976 | Martinez | 152/233 X |
| 4,324,278 | 4/1982 | Guenther | 24/299 X |

*Primary Examiner*—William A. Powell
*Assistant Examiner*—Thomas Bokan
*Attorney, Agent, or Firm*—Henry M. Bissell

[57] ABSTRACT

A motor vehicle tire chain system including a plate positioned between a tire rim and a wheel hub, extending outwardly past the tire rim and having a plurality of spaced-apart holes around an external circumference for attaching chain sections. A plurality of individual chain sections, each having a pair of ends adapted to hook in the holes in the plate, position the chain section across the tire tread, traverse the outside of the tire, recross the tire tread and are hooked in the holes on the inside of the tire at a position on the plate opposite the first attaching position. Each chain section is provided with a tensioning device which both tightens the chain and allows it to be easily installed and removed. The chain sections, after mounting on the wheel, are fastened together at their point of common intersection to hold the sections in their positions about the tire tread.

13 Claims, 10 Drawing Figures

EASY-ON TIRE CHAINS

CROSS-REFERENCE TO RELATED APPLICATION

This application is a continuation-in-part of application Ser. No. 150,458, filed May 16, 1980 for EASY-ON TIRE CHAINS, now U.S. Pat. No. 4,324,278.

BACKGROUND OF THE INVENTION

1. Field of the Invention

The present invention relates to tire chains for use on motor vehicles in ice or snow conditions. More particularly, the present invention relates to tire chains which are quickly and safely installed and removed and are not rendered inoperative by the breaking of a single link.

2. Description of the Prior Art

Many different systems for the installation of chains on motor vehicles have been suggested. The concept of using chains to improve traction in snow and ice is almost as old as the general use of motor vehicles. For example, Bodenstein U.S. Pat. No. 1,123,076, issued in 1914, describes a tire chain system very similar to that generally in use at the present time.

Since that time many different designs have been suggested. For example, Randolph in U.S. Pat. No. 1,320,916 suggests the use of plural tensioning springs to tighten a conventional ladder type of chain. Numerous other modifications in the ladder structure are known in the art. Henry in U.S. Pat. No. 2,234,492 utilizes a cable to replace one of the two long chains which connect various short traction chains crossing over the tire tread. U.S. Pat. No. 2,310,807 of Pool utilizes a helical metal spring to replace one of the two connecting chains. Morss in U.S. Pat. No. 2,252,778 uses a circular section of spring steel. Also, in U.S. Pat. No. 2,328,808 of Holtz, a ring which is rotatable at a keyed point about 150° away from a break in the ring is used in place of one of the connecting chains.

Safety devices have also been suggested. For example Poli in U.S. Pat. No. 1,455,409 suggests a separate chain section attached to the hub of a wheel and to the tire chain. If the tire chain slips off of the tire, it will be retained by the hub, dragged along and not be lost. Also, various chain patterns for the portion of the chain traversing the tire tread have been suggested; for example, see U.S. Pat. No. 2,086,512 of Reyburn.

Further, the prior art has suggested the use of a dismountable hub independent of the vehicle's wheel. In U.S. Pat. No. 1,339,963 of Mahan a hub ring and rim ring assembly on the outside of the tire are suggested. However, since the design requires the passage of the chain through the wheel and most motor vehicles today have disc wheels without sufficient space for chain passage through the wheel, this type of structure is of limited utility. McGuiness in U.S. Pat. No. 2,460,023 suggested the use of an externally mounted disc for attaching anti-skid chains without passing them through the wheel. The chains are the conventional ladder style and are attached to the wheel mounting studs by adjustable arms pivoted to the center of the mounting disc. Weaver in U.S. Pat. No. 1,472,448 suggests the use of a system that does not require a ladder chain structure. The system uses a hook to attach a chain to the inside of the tire rim and attaches the other end to an adjustable latch that is pivoted on an externally mounted hub.

SUMMARY OF THE INVENTION

The present invention improves on the tire chain art by providing a simple, safe, rapidly installable tire chain system. The chains may be installed individually without crawling underneath the vehicle, moving the vehicle or jacking the vehicle up. The chains are mounted to the rear (inboard) of the wheel and tire by hooking them to a plate or disc member which is designed to be held in position between the wheel rim and, for instance, a brake drum by the lugs which position the wheel. This member may be seasonally or permanently bolted in place, as it does not interfere with the operation of the motor vehicle.

In addition, the chains are provided as a plurality of independent sections. As a result, if one section breaks, then the remaining sections are still retained on the tire and continue to provide traction. This is a significant advantage over many prior tire chain systems, since the breaking of a link or two in an ordinary continuous tire chain can result in severe damage to the motor vehicle body if the chain is not thrown completely clear. In addition, of course, the breaking of two links in an ordinary ladder-style tire chain results in a complete loss of utility and a termination of the chain's assistance. The present tire chains hook to the hub provided behind or inboard of the tire rim, traverse the tire tread in a pattern to provide plural traction surfaces, cross the front or outside of the tire rim, provide a second set of traction surfaces in a position opposed to the first set and are then attached to the opoosite side of the hub. A plurality of these chain sections are provided for each wheel and each chain section has an independent tensioner to compensate for variations in overall tire diameter due to inflation, tire size and tire design.

A fastener is provided to secure the separate chain sections together after they are mounted on the wheel. This fastener, which may comprise a bolt, washer and nut combination or a releasable pin and washer combination, is installed through a central fastening link in each of the chain sections on the outside of the wheel where the chain sections intersect or cross each other. Securing the chain sections together at the central intersection point in this fashion serves to transfer unbalanced forces from one chain section to another and assists in maintaining the respective traction portions in the positions where they are mounted initially over the tire tread. The result is an integral chain set formed of the individual chain sections, once the sections are fastened together at the central point of intersection.

Plural gripping tracks are provided in each section of the chain that traverses the tire tread. The gripping sections may take the form of two parallel lines, a V shape, or even an X shape. In order to provide this, a pair of T-shaped connections are used to attach the ends of the gripping sections directly to opposed edges of the disc member. On the outside, the gripping sections are joined by an adjustable length of chain. The adjustment may take the form of, for example, a rotatable arm having over-center locking means, a threaded shaft or other tightening means. Each tire is provided with a plurality, e.g. two or more, of the chain sections. Each of the chain sections is independently mountable on the disc member and thus if one chain section breaks, the remaining chain sections are retained on the tire and the improved traction provided by the chains is still available to the user. In addition, this design characteristic allows the advantage of replacement of individual units should they become lost or broken, without replacement of the whole chain structure.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
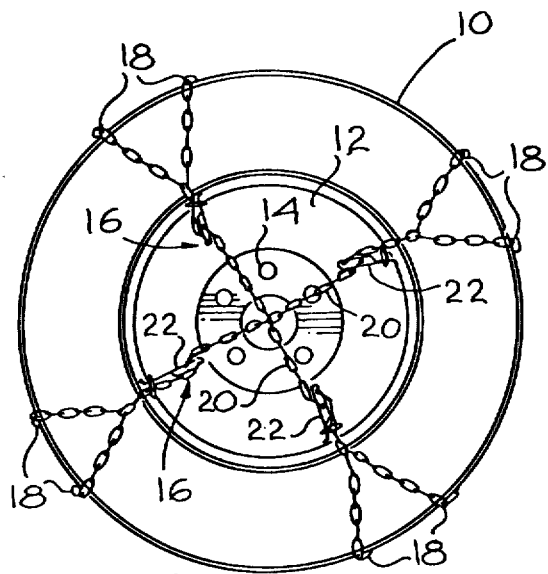
FIG. 1 shows an ordinary tire and rim having two of the chain sections of the present invention mounted thereon.

In FIG. 1, a conventional tire 10 is shown mounted on a conventional disc rim 12 having holes 14 for mounting to a motor vehicle through standard lugs and lug nuts, not shown. Tire 10, as shown, is provided with two chain sections 16 which are mounted to a disc member 44, shown in FIG. 4. However, three or more chain sections may be utilized, depending upon such factors as the overall tire diameter. Each chain section 16 is provided with a pair of V-shaped traction sections 18 which traverse the tire tread. The V-shaped sections are joined to intermediate section 20 which contains tensioning lever 22. The chains are mounted by attaching a T-shaped hook at each end of the chain section, described with respect to FIG. 3 below, to holes in the disc member 44, shown in FIGS. 4 and 5, and then tensioning the chain across the tread through the use of tensioners 22. In this manner should one of the tensioners spring loose, or a chain link break, only one of the chain sections will be taken out of service. The remaining chain sections will continue to operate and thus provide traction for the vehicle.

Figure 2:
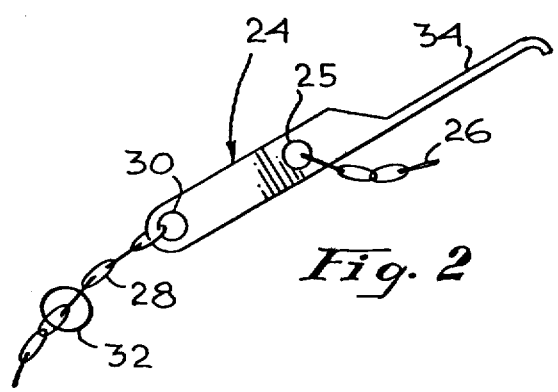
FIG. 2 shows an exemplary chain tensioner mechanism which may be utilized to tighten the chain sections.

In FIG. 2, one of the tensioners is shown. In this figure, tensioner 24 is provided with an aperture 25 for connecting a first portion of intermediate chain section 26 and a second aperture 30 for attaching a second portion of intermediate chain section 28. The tensioner is shown in the open position in this form. In operation, the tensioner would be rotated about chain attaching aperture 30 and, when pivoted 180° from the position shown, holding ring 32 would be slid over handle 34 and the tension on the chain, which tends to reverse the rotation, will hold the handle and ring in position.

Figure 3:
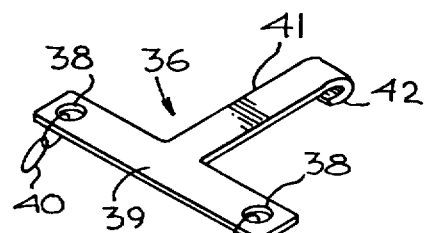
FIG. 3 shows one of the connectors used on the ends of a chain section.

In FIG. 3, the T-shaped connector attaching the chain units to the disc member is depicted. Connector 36 is provided with apertures 38 on cross member 39 which are used to attach chain 40 to the hook. Each section of chain 40 is a continuation of one of chains 18 shown in FIG. 1 and thus chains 18 cross the tread of the tire, pass behind or inside of the wheel and are attached to the hub of FIG. 4. The leg 41 of T-shaped hook 36 is provided with a curved attaching hook 42 which is positioned through an aperture in the retaining disc member. In this manner, T-shaped hook 36 may be easily positioned on the disc by merely reaching around the tire and sliding curved hooking surface 42 into one of the orifices in the disc.

Figure 4:
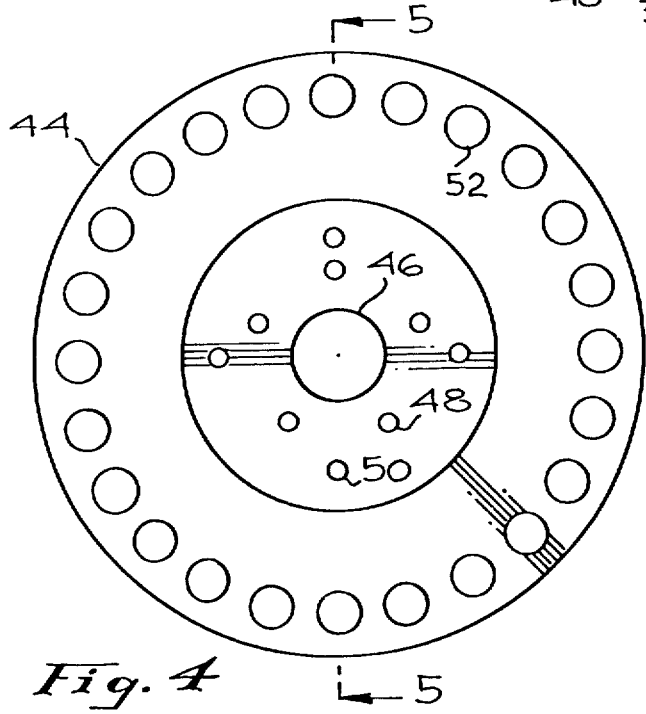
FIG. 4 is a side view of a disc member used in the present invention.

In FIG. 4, an exemplary disc member 44 is depicted. The disc is provided with an orifice 46 to accommodate mounting on the end of an axle. In addition, the disc is provided with a pattern of five holes 48 in a first bolt circle arranged in manner to match the lugs of one particular wheel for which the disc is designed. To accommodate another type of wheel, four holes 50 are provided in a second bolt circle of different radius. In this manner disc 44 may accommodate different manufacturer's wheel designs. In addition, disc 44 is provided with a large number, twenty-four as shown, of attaching apertures 52. These are positioned equidistant from the center of the disc, around the outer edges thereof, and provide multiple attaching positions for the T-shaped hooks shown in FIG. 3. In this manner numerous chain sections may be attached to the disc at different points. Thus, the disc provides for easy installation and removal of a varying number of chain sections.

Figure 5:
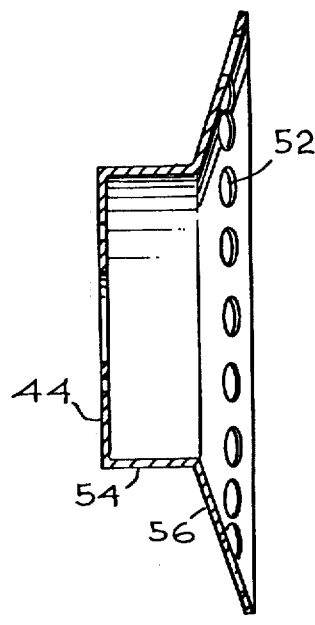
FIG. 5 is a sectional view of the disc member taken along lines 5—5 of FIG. 4.

In FIG. 5, a cross-sectional view of disc member 44 taken along lines 5—5 of FIG. 4, the attaching apertures 52 and lug holes 48 are shown. In this view the shape of the disc member is shown in detail. The center cylindrical section 54 is provided in the disc member to accommodate the lateral displacement of conventional tire rims. Conical section 56 provides the appropriate positioning of the disc member adjacent the edge of the rim of the tire so that access to apertures 52 may be had without difficulty and so that the tire chains of the present invention will not interfere with normal operation of the wheel.

Figure 6:
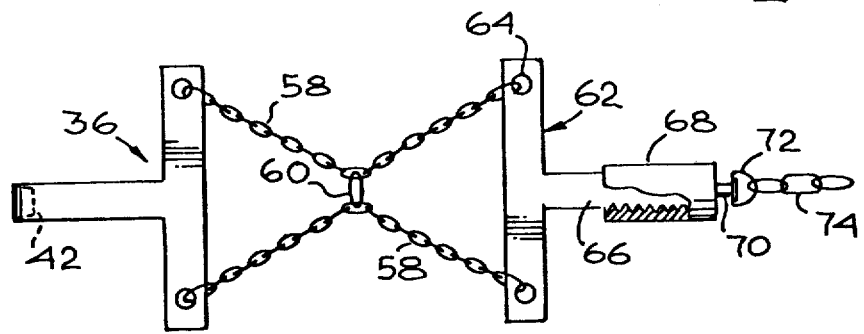
FIG. 6 shows another embodiment of the tread section and tensioner mechanism of the present invention.

In FIG. 6, a different chain tread style is shown. In this figure, the T-shaped hook 36 of FIG. 3, including hook 42 for attaching to the disc member, is connected to two chains 58 which are interconnected by jump ring 60. The chains, of course, can be continuous and interconnected with each other and can be formed in a crossing pattern, if desired. The two separate ends of chains 58 are connected to a second T-shaped connector 62 at aperture 64. T-shaped connector 62 is threaded at its elongate end 66 and is provided with an internally threaded cap 68 having a rotatable shaft 70 connected to ring 72 and to intermediate chain section 74. In this manner a fully adjustable chain section is provided. In addition, extension 66 of T-shaped connector 62 may be threaded further along its shaft, and provided with a lock nut or, in the alternative, a locking pin or cotter key arrangement may be provided.

Figure 7:
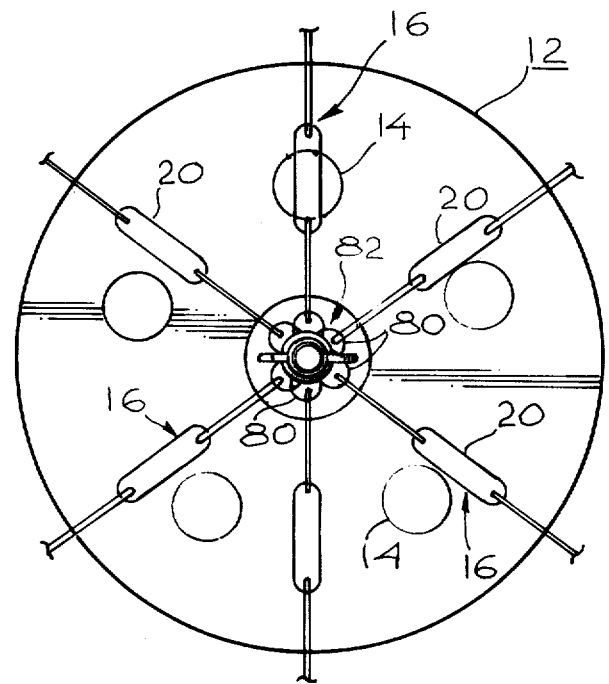
FIG. 7 shows a portion of the arrangement of FIG. 1 with a central fastener installed to hold the chain sections in position.

FIG. 7 is a view corresponding to the central portion of the arrangement shown in FIG. 1. In FIG. 7, only the intermediate portions 20 of three distinct chain sections 16 are shown. These intermediate portions 20 cross over, or intersect, each other at central fastening links 80 which, as mounted, are situated on the outside of the wheel in line with the axle. A fastening device 82 is shown which extends through all three of the central fastening links 80 and secures them together. This fastener 82 is releasable so that it can be installed or removed when the chain sections 16 are mounted on the wheel.

Figure 8:
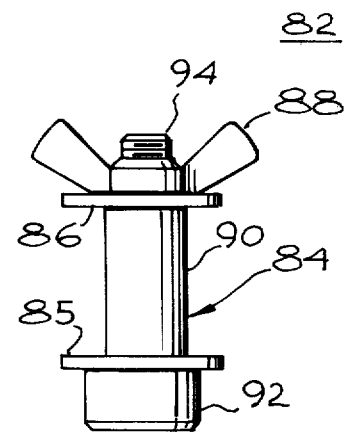
FIG. 8 is a partial sectional view showing one type of chain fastener for use as shown in FIG. 7.

One such releasable fastener 82 is shown in FIG. 8 in the form of a bolt 84 having washers 85, 86 and a wing nut 88 threaded on the end 94 of the bolt. The bolt 84 is preferably provided with an enlarged shank portion 90 having a diameter generally conforming to the width of the opening in a central fastening link 80. The bolt head 92, which may be shaped for gripping by a wrench or the like, preferably has the washer 85 fixed in position next to it. The washer 86 is removable with the wing nut 88 from the threaded end 94. As indicated in FIG. 7, the bolt 84 is inserted from the inboard side of the central fastening links 80 through each of the links 80 until the threaded end 94 protrudes. The washer 86 is then placed in position and the wing nut 88 threaded onto the bolt until the central fastening links 80 are clamped together in a relatively rigid configuration, as shown in FIG. 7. This serves to secure each of the chain sections 16 in the position as originally mounted on the wheel, despite the forces developed during operation of the vehicle which might tend to cause the traction sections 18 (FIG. 1) to slip around the tire, by virtue of the fact that such unbalanced forces on one chain section 16 are transferred to the remaining chain sections with the result that the entire chain system becomes tightened in place.

Figure 9:
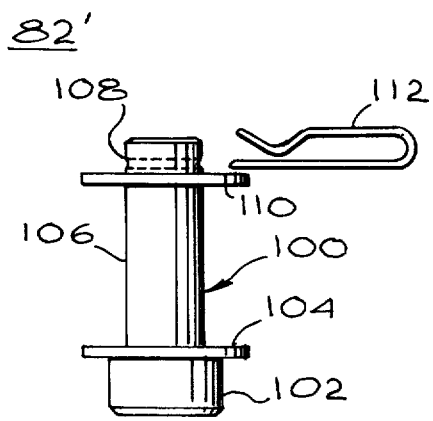
FIG. 9 shows another type of chain fastener as used in FIG. 7.

FIG. 9 shows an alternative fastener 82' in the form of a pin 100 having a cap 102 and a washer 104 which is preferably fixed adjacent the cap. The shank 106 of the pin 100 is provided with a transverse hole 108 adjacent the distal end of the pin 100. A second washer 110 is provided for mounting in the position shown, after the pin 100 has been inserted from the inboard side through the central fastening links 80. After such assembly, a spring clip 112 is inserted through the hole 108 to retain the washer 110 in position and to hold the fastener 100 in place until it is desired to remove the chains from the wheel.

Figure 10:
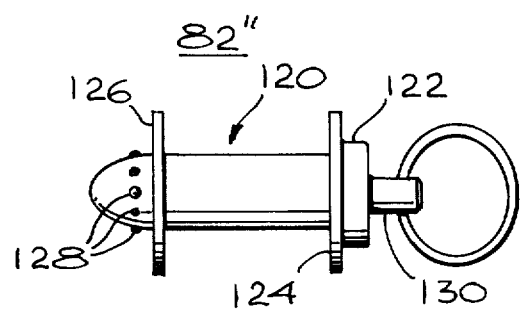
FIG. 10 shows still another type of chain fastener for use in FIG. 7.

FIG. 10 shows still another fastener 82'' in the form of a ball-pin 120 having a cap 122 and washer 124 formed on the proximal end of the pin. Another, removable, washer 126 is provided for positioning on the distal end. The pin 120 is provided with a plurality of balls 128 adjacent the distal end which are mounted in known fashion to protrude slightly from the surface of the pin 120. These balls 128 are held in the position shown by an internal pin member attached to the actuator 130. The balls 128 can be released by axial movement of the actuator 130, relative to the pin 120, at which time the balls 128 are released to move radially inward so that the washer 126 can be installed on, or removed from, the shank of the pin 120. In use, the ball-pin 82'' would preferably be inserted from the outboard side through the central fastening links 80, after which the washer 126 would be mounted from the inboard side and the actuator 130 released to the position where the balls 128 are forced outward to engage the washer 126 in the position shown.

Although there have been described above specific arrangements of a tire chain system for easy installation on conventional motor vehicles in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined by the appended claims.

What is claimed is:

1. A tire chain assembly adapted for use on wheels mounted to hubs on motor vehicles comprising:
 a shaped disc adapted to be secured between a wheel and a hub, said disc projecting radially outwardly from its mounting and defining a plurality of anchoring apertures circumferentially spaced about the outward projection thereof;
 a plurality of elongated chain sections, each chain section comprising:
 (a) a pair of hook elements at opposite ends thereof for attaching to the disc at generally diametrically opposite anchoring apertures thereon,
 (b) two pairs of tread chain segments, the segments of a pair being fastened at one end to a corresponding hook element at points spatially separated from each other, the segments being attached at their other ends to corresponding ends of an intermediate chain, and
 (c) an intermediate chain joining the pairs of tread chain segments for extending diametrically across the face of a wheel when the chain section is mounted in operative position in order to permit independent mounting of the chain section and establish traction for the wheel independently of other sections of the assembly; and
 a releasable fastener for securing together the intermediate chains at a point where they intersect with each other in the vicinity of the center of the assembly.

2. The tire chain assembly of claim 1 wherein the plurality of chain sections comprises at least two sections.

3. The tire chain assembly of claim 1 characterized by each pair of tread chain segments being joined together at their juncture with a corresponding end of the intermediate chain and forming a V-shaped configuration for extending across the tire tread.

4. The tire chain assembly of claim 1 wherein the anchoring apertures are fixed in position in the disc for securing the hook elements attached to the disc therethrough against circumferential displacement.

5. The tire chain assembly of claim 1 wherein the disc comprises a first cylindrical section for positioning within the wheel rim and having a generally planar portion transversely oriented thereon for mounting between the wheel and the hub, the generally planar portion defining a plurality of bolt holes mounted in a selected pattern to correspond to the positions of wheel mounting bolts on the hub.

6. The tire chain assembly of claim 1 wherein the hook elements are characterized by being shaped like a tee, the tee having a hook at the base of the leg portion of the tee shaped to loop through a selected one of the anchoring apertures and defining a pair of openings at opposite ends of the crossbar portion of the tee for fastening the associated tread chain segments to the hook element.

7. The tire chain assembly of claim 1 wherein each chain section includes a chain tensioning member mounted in the intermediate chain portion of the section.

8. The tire chain assembly of claim 1 wherein each intermediate chain includes at least one central fastening link for receiving the releasable fastener therein.

9. The tire chain assembly of claim 8 wherein the releasable fastener comprises a bolt having a central shank portion of diameter corresponding substantially to the width of the opening of said central fastening link, a cap and fixed washer mounted at one end of the shank portion, a threaded portion of reduced diameter on the oher end of the shank portion, and a removable washer and nut for threadably engaging the threaded portion.

10. The tire chain assembly of claim 9 wherein the shank portion is of a length corresponding generally to the thickness of the number of central fastening links to be fastened together.

11. The tire chain assembly of claim 1 wherein the releasable fastener comprises a pin having a head and washer mounted at one end, the other end having a transverse opening extending therethrough, and further comprises a removable washer for mounting on said pin and a spring clip for threading through said opening to retain the pin and removable washer.

12. The tire chain assembly of claim 11 wherein each intermediate chain includes at least one central fastening link having an opening adapted to receive said pin, the diameter of the pin corresponding generally to the width of the link opening.

13. The tire chain assembly of claim 1 wherein the releasable fastening member comprises a ball-pin having a first washer, fixed in position near the proximal end thereof, and a second washer for removably mounting on the pin when the pin is threaded through the intermediate chains at their point of intersection.

* * * * *